United States Patent
DeVera

(10) Patent No.: US 8,568,898 B2
(45) Date of Patent: *Oct. 29, 2013

(54) METHOD FOR MAKING HIGH PURITY METAL OXIDE PARTICLES AND MATERIALS MADE THEREOF

(75) Inventor: Antonio L. DeVera, Avon Lake, OH (US)

(73) Assignee: Momentive Performance Materials Inc., Waterford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/455,824

(22) Filed: Apr. 25, 2012

(65) Prior Publication Data

US 2012/0208024 A1 Aug. 16, 2012

Related U.S. Application Data

(63) Continuation of application No. 12/701,862, filed on Feb. 8, 2010, now Pat. No. 8,197,782.

(51) Int. Cl.

| | |
|---|---|
| C01B 13/14 | (2006.01) |
| C01B 33/12 | (2006.01) |
| C01B 13/00 | (2006.01) |
| C01B 31/24 | (2006.01) |
| C01B 31/00 | (2006.01) |
| C01G 25/02 | (2006.01) |
| C01G 27/02 | (2006.01) |
| C01G 49/02 | (2006.01) |
| C01G 31/02 | (2006.01) |
| C01G 33/00 | (2006.01) |
| C01G 35/00 | (2006.01) |
| C01F 7/02 | (2006.01) |
| B22F 3/00 | (2006.01) |
| B22F 3/26 | (2006.01) |
| B22F 5/00 | (2006.01) |
| B22F 7/00 | (2006.01) |
| B22F 1/02 | (2006.01) |
| C01C 1/00 | (2006.01) |
| C01D 1/02 | (2006.01) |
| C22C 28/00 | (2006.01) |
| C22C 29/00 | (2006.01) |

(52) U.S. Cl.
USPC ........... 428/546; 423/335; 423/608; 423/632; 423/625; 423/594.17; 423/593.1; 423/592.1; 423/415.1; 423/419.1; 428/570

(58) Field of Classification Search
USPC .......... 423/263, 335–340, 414–436, 423/592.1–594.19; 428/546, 570
See application file for complete search history.

(56) References Cited

U.S. PATENT DOCUMENTS

| | | | |
|---|---|---|---|
| 4,317,668 A | 3/1982 | Susa et al. | |
| 4,767,433 A | 8/1988 | Iura et al. | |

(Continued)

FOREIGN PATENT DOCUMENTS

| | | |
|---|---|---|
| EP | 0 823 403 | 7/2003 |
| WO | 2006011252 | 2/2006 |

(Continued)

OTHER PUBLICATIONS

Gonzalez-Oliver et al., "Porous Silicate Beads by Gelation" Journal of Non-Crystalline Solids 100 (1988), 274-277.*

(Continued)

*Primary Examiner* — Anthony J Zimmer
(74) *Attorney, Agent, or Firm* — Joseph E. Waters

(57) ABSTRACT

The present invention is directed to a method of making metal oxide and mixed metal oxide particles. The method includes treating a mixture formed from a metal source, such as metal alkoxide, a surfactant, and a first alcohol in an aqueous media at a very high metal oxide yield. The mixture is reacted using a catalyst to form metal oxide particles having a desired particle size in said mixture. The method is particularly suitable for forming silica particles. The metal oxide particles can then be heat treated to form synthetic fused metal oxides such as, for example, synthetic fused silica.

28 Claims, 9 Drawing Sheets

(56) References Cited

U.S. PATENT DOCUMENTS

| | | |
|---|---|---|
| 4,937,208 A | 6/1990 | Yamamoto |
| 4,940,571 A | 7/1990 | Su et al. |
| 4,943,425 A | 7/1990 | Su et al. |
| 4,943,542 A | 7/1990 | Hayashi et al. |
| 4,946,805 A | 8/1990 | Shaw |
| 4,979,973 A | 12/1990 | Takita et al. |
| 4,983,369 A | 1/1991 | Barder et al. |
| 5,008,219 A | 4/1991 | Hara |
| 5,011,669 A | 4/1991 | Tsuchiya et al. |
| 5,017,354 A | 5/1991 | Simms et al. |
| 5,019,146 A | 5/1991 | Hara |
| 5,021,073 A | 6/1991 | Takita et al. |
| 5,028,247 A | 7/1991 | Asami et al. |
| 5,030,433 A | 7/1991 | Mehrotra |
| 5,063,179 A | 11/1991 | Menashi et al. |
| 5,145,510 A | 9/1992 | Saito et al. |
| 5,186,745 A | 2/1993 | Maniar |
| 5,202,104 A | 4/1993 | Watanabe et al. |
| 5,207,814 A | 5/1993 | Cogliati et al. |
| 5,211,733 A | 5/1993 | Fukao et al. |
| 5,256,386 A | 10/1993 | Nystrom et al. |
| 5,304,364 A | 4/1994 | Costa et al. |
| 5,312,613 A | 5/1994 | Shyu et al. |
| 5,328,645 A | 7/1994 | Lin et al. |
| 5,372,796 A | 12/1994 | Wellinghoff |
| 5,395,604 A | 3/1995 | Harris et al. |
| 5,425,930 A | 6/1995 | Anderson |
| 5,480,582 A | 1/1996 | Pope |
| 5,516,350 A | 5/1996 | Onoda et al. |
| 5,558,849 A | 9/1996 | Sharp |
| 5,604,163 A | 2/1997 | Endo et al. |
| 5,637,507 A | 6/1997 | Wicks et al. |
| 5,656,250 A | 8/1997 | Tanaka et al. |
| 5,665,133 A | 9/1997 | Orii et al. |
| 5,718,907 A | 2/1998 | Labarre |
| 5,800,606 A | 9/1998 | Tanaka et al. |
| 5,837,025 A | 11/1998 | Auchter-Krummel et al. |
| 5,871,558 A | 2/1999 | Takei et al. |
| 5,879,649 A | 3/1999 | Henderson et al. |
| 5,944,966 A | 8/1999 | Suetsugu et al. |
| 5,979,186 A | 11/1999 | Koppler et al. |
| 6,071,838 A | 6/2000 | Endo et al. |
| 6,103,209 A | 8/2000 | Balducci et al. |
| 6,110,852 A | 8/2000 | Katsuro et al. |
| 6,129,899 A | 10/2000 | Katsuro et al. |
| 6,131,409 A | 10/2000 | Katsuro et al. |
| 6,191,824 B1 | 2/2001 | Ogawa |
| 6,225,245 B1 | 5/2001 | Utsunomiya et al. |
| 6,296,826 B1 | 10/2001 | Fujinoki et al. |
| 6,360,564 B1 | 3/2002 | Cornelius et al. |
| 6,408,648 B1 | 6/2002 | Morizane |
| 6,426,371 B1 | 7/2002 | Li et al. |
| 6,432,151 B1 | 8/2002 | So et al. |
| 6,437,007 B1 | 8/2002 | Smith et al. |
| 6,645,908 B1 | 11/2003 | Sigman et al. |
| 6,652,612 B2 | 11/2003 | Nakayama et al. |
| 6,826,927 B2 | 12/2004 | Fukui et al. |
| 6,838,068 B2 | 1/2005 | Katsuro et al. |
| 6,849,242 B1 | 2/2005 | Koeppler et al. |
| 7,063,826 B2 | 6/2006 | Katsuro et al. |
| 7,074,376 B2 | 7/2006 | Katsuro et al. |
| 7,101,523 B2 | 9/2006 | Mori et al. |
| 7,232,556 B2 | 6/2007 | Yadav |
| 7,238,331 B2 | 7/2007 | Zhou et al. |
| 7,312,170 B2 | 12/2007 | Nishimura et al. |
| 7,427,387 B2 | 9/2008 | Katsuro et al. |
| 7,452,518 B2 | 11/2008 | Hansen et al. |
| 7,506,521 B2 | 3/2009 | Bookbinder et al. |
| 7,514,382 B2 | 4/2009 | Ikuta et al. |
| 7,534,733 B2 | 5/2009 | Bookbinder et al. |
| 7,589,039 B2 | 9/2009 | Allan et al. |
| 7,731,110 B2 | 6/2010 | Huang |
| 7,736,613 B2 | 6/2010 | Fukui et al. |
| 8,034,740 B2 | 10/2011 | Kitahata et al. |
| 2003/0069347 A1 | 4/2003 | Oishi et al. |
| 2003/0157011 A1 | 8/2003 | Mori |
| 2004/0056376 A1 | 3/2004 | Coronado |
| 2004/0091411 A1 | 5/2004 | Modrek-Najafabadi |
| 2004/0253170 A1 | 12/2004 | Zhou et al. |
| 2004/0254279 A1 | 12/2004 | Orchison et al. |
| 2006/0079387 A1 | 4/2006 | Costa et al. |
| 2006/0099130 A1 | 5/2006 | Roque-Malherbe et al. |
| 2006/0150676 A1 | 7/2006 | Kim et al. |
| 2006/0150860 A1 | 7/2006 | Nozaki |
| 2007/0237701 A1 | 10/2007 | Yamakawa et al. |
| 2008/0025900 A1 | 1/2008 | Mori |
| 2008/0070146 A1 | 3/2008 | Fomitchev et al. |
| 2008/0170979 A1 | 7/2008 | Wang et al. |
| 2008/0206562 A1 | 8/2008 | Stucky et al. |
| 2008/0241044 A1 | 10/2008 | Kuebelbeck |
| 2008/0311397 A1 | 12/2008 | Tatsumi et al. |
| 2010/0003182 A1 | 1/2010 | Costa et al. |
| 2010/0003204 A1 | 1/2010 | Loy et al. |

FOREIGN PATENT DOCUMENTS

| | | |
|---|---|---|
| WO | 2008015943 | 2/2008 |
| WO | 2008072637 | 6/2008 |

OTHER PUBLICATIONS

International Search Report and Written Opinion for PCT/US2012/048589 dated Oct. 10, 2012.

International Search Report and Written Opinion for PCT/US2011/023695 dated Apr. 4, 2011.

Gonzalez-Oliver, M. Schneider, Porous Silicate Beads by Gelation, Journal of Non-Crystalline Solids 100 (1988) 274-277, North-Holland, Amsterdam, Elsevier Science Publishers B.V. (North Holland Physics Publishing Division).

Arriagada, F.J. and Osseo-Asare, K., Synthesis of Nanosize Silica in Aerosol OT Reverse Microemulsions, Journal of Colloid and Interface Science (1995) 170, 8-17, Acedemic Press, Inc.

\* cited by examiner

METHOD FOR MAKING HIGH PURITY METAL OXIDE PARTICLES AND MATERIALS MADE THEREOF

CROSS-REFERENCE TO RELATED APPLICATION

This application is a Continuation of U.S. application Ser. No. 12/701,862, filed Feb. 8, 2010, which is incorporated herein in its entirety by reference.

FIELD OF INVENTION

The disclosed technology is directed to a method of making particles of metal oxides and the production of materials made therefrom, and finds particular applicability in the synthesis of synthetic silica particles for fused synthetic silica materials.

BACKGROUND OF THE INVENTION

Metal and mixed metal oxides are useful as functional materials to provide heat resistance/conduction, as structural materials, composite membranes for fuel cells, solar cells, catalysts, controlled delivery, coatings, light diffusers, cosmetics, ceramic glasses, etc, wherein the particle size and morphology such as shape, internal porosity, and surface area may be important. Included among the metals used in such compounds are tetravalent metals such as zirconium, vanadium, titanium, silicon, and yttrium, although lower valence metals such as aluminum are also particularly useful. Because of its relative abundance, silicon oxides have been the material of choice for a wide variety of commercial usages from nanoparticles used in polymer composites to synthetic silica for production of ultrahigh purity fused quartz materials for semiconductor applications.

Controlled particle size, target surface areas, and target porosities have been a matter of interest in recent years due to wide commercial applications. Current techniques for producing metal oxides, however, have a number of limitations and do not offer a single chemistry for providing a wide range of properties.

More specifically for silicon metal and its corresponding silicon dioxide (silica), current techniques for synthesis of synthetic silica powder are based on sol-gel methods, ion-exchange of sodium silicate glass, and sol-gel pore filling of fumed silica from flame hydrolysis of silicon tetrachloride in the presence of oxygen and hydrogen. Commercially available synthetic silica glass is primarily made utilizing; (1) a method in which a fume generated by decomposition of silicon tetrachloride or an organosilicon material in an oxyhydrogen flame is deposited and grown on a substrate; (2) a method in which a silica gel obtained by e.g. hydrolysis and gelation of e.g. a silicon alkoxide, is baked and a synthetic silica powder thereby obtained is further densified to make a glass; or (3) direct sol-gel processing usually used for smaller parts.

However, the method (1) has a problem in that the production cost is extremely high. On the other hand, in the method (2) employing a silica gel, particularly a silica gel derived from a silicon alkoxide, it is possible to obtain a synthetic silica powder having relatively low content of minor impurities, but the desired impurity level is not necessarily satisfied.

Silica sol has been conventionally made by using a sodium silicate solution called water glass as starting material. In this way, sodium silicate solution is treated using a cation-exchange resin so that ions, such as sodium ion in sodium silicate, are removed in order to increase the purity of the starting material. Then, the resultant is used for producing silica sol. Such a technique is disclosed in U.S. Publication No. 2007/0237701, which is incorporated by reference. However, because the above-method employs an ion-exchange resin for purification, its purity is limited to some degree. Thus, it is difficult to produce silica sol having 1 ppm or lower content of metal impurities, such as alkali metals (e.g., sodium), copper, nickel, and/or aluminum, which is required for use with electronic materials.

Alternatively, methods for making relatively high purity synthetic silica particles include hydrolyzing and condensing alkoxysilanes and using pulverization techniques. An example of a method using pulverization techniques for preparation of silica particles useful for high purity synthetic silica applications is disclosed in U.S. Pat. No. 6,131,409, which is incorporated by reference. Because of restrictions with respect to the purity of the starting material and the many process steps required to achieve the final particle size, various other processes have been attempted.

These methods and techniques, however, also have a number of limitations. For example, they do not appear to produce very high yields of silica. Also, as disclosed in U.S. Pat. No. 4,767,433, these methods and techniques do not form silica having a desired particle size, such as the particle size of 200 to 300 microns required by some fusion processes. These relatively larger particle size ranges also would be useful in the production of crucibles for semiconductor and glass articles useful to semiconductor processing such as, for example, racks, windows and containments, and fiber optics.

SUMMARY OF THE INVENTION

The present invention is directed to a method of making high purity metal oxide, metal hydroxide, metal oxhydroxide, metal carbonate, and/or metal oxynitride particles. In one embodiment, the method is particularly suitable for making synthetic silica. The method includes treating a mixture formed from a water suspension containing a metal source, a surfactant system, and a phase enhancer. The mixture is reacted with a catalyst to form metal oxide particles having a desired size without gellification of said mixture at high solids content.

More specifically, the present invention provides, in one aspect, a method for making particles comprising forming a first phase comprising a mixture of water, a metal source, a first catalyst, a first surfactant, and a first alcohol; adding the first phase to a second phase comprising water, a second alcohol, and a second surfactant to form a blend; treating the blend with a measured amount of a phase enhancer; and reacting the blend with a second catalyst to form particles.

In one aspect, the particles are condensed to metal oxide particles with a base catalyst to form particles of a desired size without gellification of the suspension.

Applicants have found that the use of slightly polar alcohols, such as, for example, butanol and the like as phase enhancers prevents excessive particle agglomeration during the addition of the second catalyst and further curing. The amount and type of phase enhancer(s) can be used to control the rate and degree of particle agglomeration. For example, it has been found that less phase enhancer can cause gellification of the entire reaction mass.

DETAILED DESCRIPTION

The present method is directed to generating a high yield of high purity synthetic metal oxide particles for use in various applications. In one embodiment, the method is used to form synthetic silica particles that may be used in the production of fused synthetic silica products. Non-limiting examples of other metal oxides that can be formed from the present method include, for example, $TiO_2$, $Fe_2O_3$, $SiO_2$, $Al_2O_3$, $ZrO_2$, $Nb_2O_3$, $Y_2O_3$, rare earth oxides, molecular mixtures and compounds thereof, and composite and decorated structures thereof. The term metal oxides may also encompass metal hydroxides, metal carbonates, metal oxycarbonates, metal hydroxycarbonates, methylated metal oxides, and the like. For convenience, the following description may recite or refer to the specific embodiment where the particles being synthesized are silica particles and the materials used in the inventive process and generated therefrom are thus specific to this embodiment. However, the general process will be similar for the synthesis of all metal oxide particles, and thus these descriptions and process steps should be considered as applying in a general sense to any metal oxide particle made from the present process, with only the corresponding raw materials and products as the significant differences.

The present method is capable of forming high purity synthetic particles having a particle size in a desired range. In this method, controlling synthetic particle growth to a desired size can be accomplished by controlling at least one of following properties: particle reactor pH; temperature of the particle reactor; molecular weight of the nonionic surfactant; concentration and rate of addition of the base catalyst to the particle reactor; the type and amount of phase enhancer; and/or temperature during acid hydrolysis.

Contrary to existing methods or techniques for producing synthetic silica and other metal oxide particles, the present method can include adding a phase enhancer, such as a non-highly polar or slightly polar alcohol, to create a stable emulsion as an enabler for particle growth from micellar particles. Also contrary to known methods or techniques, the present method further includes a measured addition rate of a second catalyst that allows for gradual particle growth without gellification of the reaction mass. This measured addition rate of a second catalyst allows for particle growth to a desired size and is a function of the type of phase enhancer molecular weight.

In further contrast to known methods or techniques, the present method provides high purity metal oxide particulars without the need to form gel blocks and then subsequently grind or pulverize those gel blocks to form particles.

Figure 1:
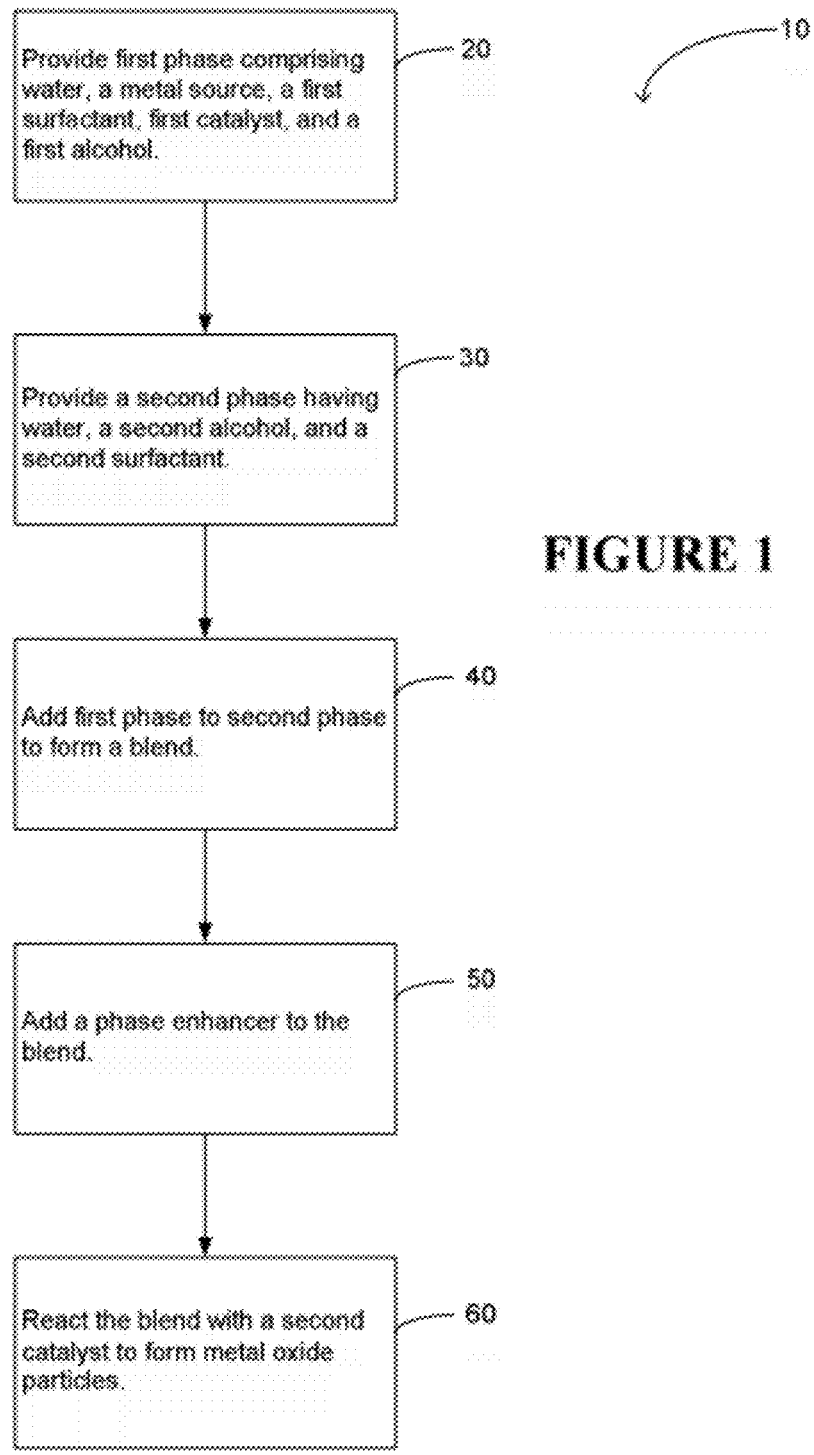
FIG. 1 shows a flowchart illustrating a method for making high purity metal oxide particles.
Figure 2:
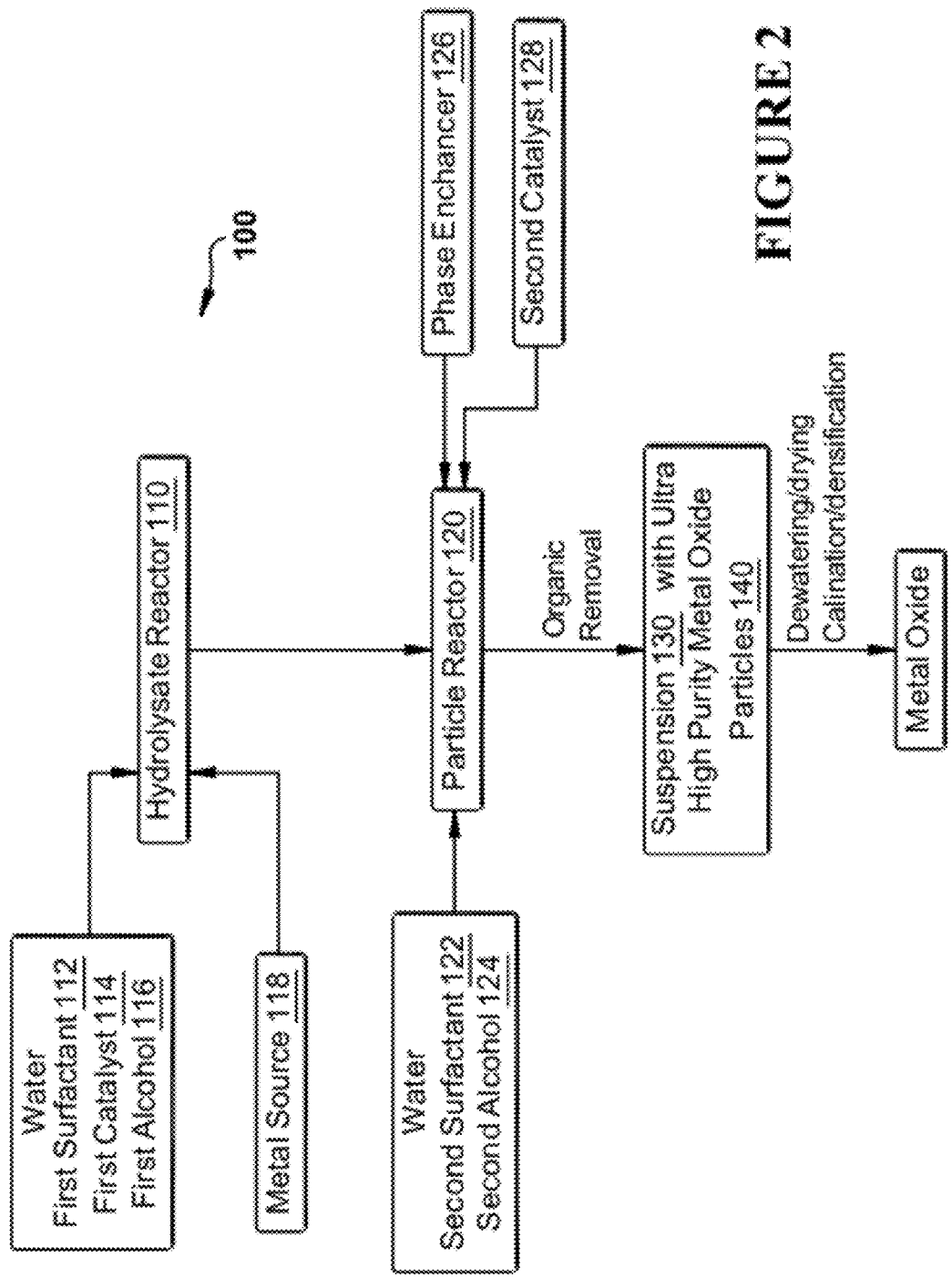
FIG. 2 shows a flow chart illustrating aspects of the method of FIG. 1.

FIGS. 1 and 2 illustrate aspects of a method for making metal oxide particles. Referring to FIG. 1, a method 10 of forming a metal hydroxide includes, as shown in block 20, providing a first phase comprising water, a metal source, a first catalyst, a first surfactant, and a first alcohol. At block 30, the method includes providing a second phase comprising water, a second alcohol, and a second surfactant. At block 40, the first phase is added to the second phase to form a blend. At block 50, the blend formed from the first and second phases is treated with a phase enhancer. At block 60, a second catalyst is added to the blend to form metal oxide particles.

FIG. 2 illustrates further aspects of the method 10 described in FIG. 1. Providing the first and second phases may include, in one aspect, preparing the first and/or second phases. Preparing the first and second phases may be accomplished by adding the appropriate components to a system, which may also be referred to herein as a container, vessel, reactor, and the like. The method 10 can include forming a metal oxide, metal oxyhydroxide, etc. The method may employ a system 100 for providing or preparing a hydrolysate reactor 110 comprising the first phase and a particle reactor 120 comprising the second phase. The contents of the hydrolysate reactor are charged to or added to the particle reactor to carry out the reaction, which will be discussed in greater detail below.

The method employs a hydrolysate reactor 110 to form or prepare the first phase. The first phase may be formed in the hydrolysate reactor 110 by adding a first surfactant 112, a first catalyst 114, a first alcohol 116, and water to the reactor 110 in proportion to the amount of metal source that promotes the formation of oligomers.

The first catalyst may comprise an acid catalyst or a base catalyst. In one embodiment, the first catalyst is an acid type catalyst. Examples of suitable acid catalysts include, but are not limited to, hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof. In one embodiment, the first catalyst comprises a base catalyst chosen from ammonium hydroxide, quaternary ammonium hydroxides, hydroxylamines, derivatives of hydroxylamines, amino pyridines, or combinations of two or more thereof. In one embodiment, the base catalyst has a concentration of about 0.01% to about 10% by weight.

The first alcohol may be chosen from a primary alcohol, a secondary alcohol, or a combination of two or more thereof. In one embodiment, the primary alcohol is an alcohol having one to ten carbons. Suitable alcohols include, but are not limited to, methanol, ethanol, propanol, butanol, pentanol, hexanol, heptanol, octanol, nonanol, decanol, or combinations of two or more thereof.

In one aspect, the first surfactant may be a co-surfactant system. The co-surfactant can aid in transporting solution to the micelle containing metal oxide oligomers such as, for example, low molecular weight polymethoxysiloxanes. In one embodiment, the co-surfactant system includes a mixture of a non-polar compound and a slightly polar compound. The nonpolar compound may be a hydrocarbon such as cyclic hydrocarbons including cyclopentane, cyclohexane, cyclooctane, and even derivatives thereof such as methyl cyclohexane, p-alkyl cyclohexane, and the like, and linear or branched aliphatic hydrocarbon having carbon numbers from 5 to 12 and alkyl derivatives thereof such as isopentane, isohexane, isooctane, and the like, or a combination of two or more non-polar compounds. The slightly polar compound of the co-surfactant system may be a slightly polar alcohol. Particularly suitable slightly polar alcohols may be chosen, for example, from tertiary alcohols, cyclic alcohols, or combinations of two or more thereof. Suitable tertiary alcohol include, for example, tertiary butyl alcohol, 2-methyl 2-butanol or tertiary amyl alcohol, or derivatives thereof such as 2-methyl 2-pentanol, 2-methyl 2-hexanol, and the like. Non-limiting examples of suitable cyclic alcohols include cyclopentanol, cyclohexanol, cyclooctanol and alkyl derivatives thereof such as 4-methylcyclohexanol, and the like.

Additional examples of surfactants suitable for the co-surfactant include, for example, alcoholic solvents and ketonic solvents. Examples of suitable alcoholic solvents include, for example, tertiary amyl alcohols, methyl alcohol, ethyl alcohol, n-propanol, i-propanol, n-butanol, i-butanol, sec-butanol, t-butanol, 4-methyl 2-pentanol, cyclohexanol, methylcyclohexanol, and/or glycerol. Examples of suitable ketonic solvents include acetone, methyl ethyl ketone, methyl-n-propyl ketone, methyl-n-butyl ketone, methyl-i-butyl ketone, diethyl ketone, cyclohexanone, methylcyclohexanone or acetylacetone.

The first phase includes, a metal source 118. The metal source may include a single metal based material or a plurality of metal based materials. In one aspect, the metal source may be any hydrolysable metal source. The metal source may include, for example, a metal alkoxide, a hydrolysable organometallic compound, oxo metal oligomers, or mixtures of two or more thereof. Of course, the metal oxide desired as a final product will determine the identity of the metal source. Thus, in one embodiment wherein synthetic silica is the desired product, the metal source 118 is a silicon alkoxide. Examples of silica sources include, but are not limited to, tetramethylorthosilicate (TMOS), tetraethylorthosilicate (TEOS), tetrapropylorthosilicate (TPOS), tetraethoxy silane, tetramethoxy silane, tetrabutoxy silane, methyl trimethoxy silane (MTMS), methyl triethoxy silane (MTES), phenyl trimethoxy silane and isobutyl trimethoxy silane, and higher tetraalkoxysilanes, siloxane oligomers derived from alkoxysilanes, and pre-polymerized alkoxysilanes such as polymethoxysiloxane so long as it is amenable to micelle formation, including a tetramer of polymethoxysiloxane such as methylsilicate. In one embodiment, the first phase has a molar ratio of water to siloxane oligomer derived from alkoxysilane to provide at least a siloxane heptamer, a cyclic siloxane, or mixtures thereof. A high purity silica source, such as alkoxysilane, can be obtained from a crude source such as those formed from the reaction of silicon metal with methanol in the presence of a metal catalyst such as copper such as those exemplified in E. G. Rochow, "Methyl Silicate from Silicon and Methanol," Jl. Amer. Chem. Soc. 70, 2170-2171 (1948), U.S. Pat. Nos. 4,727,173, 4,999,446, and 5,084,590, which are incorporated by reference. Purification of alkoxysilane can be accomplished by distillation as provided in U.S. Pat. No. 5,902,893 which is incorporated by reference.

Examples of other metal sources for the production of other metal oxide particles include metal compounds as isopropoxides, acetates, acetylacetonate, oxylates, butoxides, methoxides, ethoxides, chloromethoxy, chloroethoxy, methyls, ethyls, and the like. Examples of other suitable metals include, but are not limited to, Ti, Fe, Al, Zr, Nb, Y, rare earth metals and combinations of two or more thereof.

The first phase may be formed, in one embodiment, by first charging water, the first surfactant 112, the first catalyst 114, and the first alcohol 116 to the hydrolysate reactor 110. The metal source 118 can be added in a controlled or measured manner to the hydrolysate reactor 110. The metal source reacts in the hydrolysate reactor to form a metal oxide oligomer. The metal source may be added to the hydrolysate reactor to control the temperature rise of the system. For example, in one embodiment, a silica source is added to the hydrolysate reactor at a rate so that the adiabatic temperature rise is at a temperature range from about 10° to about 100° C., and preferably the temperature rise is to about 72° C. The silica source can react in the hydrolysate reactor 110 to form oligomers of methoxysiloxanes when a methoxy silane is employed. In one embodiment, the rate of adding a silica source can be about 5-15 gm/min for a 2300 gm batch size. In one embodiment, metal source may be added to the first phase over a period of from about 20 to about 120 minutes. In one embodiment, the metal source comprises a metal alkoxide, and the molar ratio of water to metal alkoxide source in the first phase is from about 0.5 to about 4.0.

While not depicted as a separate addition, in FIG. 2, it will be appreciated that the first surfactant 112 can be added to the hydrolysate reactor 110 after the addition of the metal source 118. The first surfactant such as, for example, a co-surfactant can be added in a measured or controlled manner or added after the all the metal source is added to the hydrolysate reactor 110. As with the surfactant in the particle reactor, the co-surfactant facilitates in forming the metal oxide polymers within a micellar structure as dictated by phase equilibrium.

The second phase may be formed in a particle reactor 120. This may be accomplished by adding water, a second surfactant 122, and a second alcohol 124 to the particle reactor.

In one embodiment, the second surfactant 122 is a nonionic surfactant. The molecular weight of the nonionic surfactant, including, but not limited to those based on ethoxylate, polyethoxylate, polypropoxylate, phenolate, or polyol and the like, may be from about 400 to about 100,000. Examples of suitable nonionic surfactants include, but are not limited to, polyethylene glycol, polypropylene glycol, phenolates, polyols, polyoxyethylene stearate, polyoxyethylene sorbitan monooleate, polyoxyethylene lauryl ether, nonylphenoxypoly(ethyleneoxy)ethanol, nonylphenyoxypoly(ethyleneoxy)ethanol, and combinations of two or more thereof.

The second alcohol 124 may be chosen from a primary alcohol, a secondary alcohol, or a combination of two or more thereof. Suitable primary alcohols include, primary alcohols having from one to ten carbon atoms such as those previously described with respect to the first alcohol. The second alcohol may be the same or different than the first alcohol.

Applicants have found that suitable materials for the phase enhancer include those materials that are suitable for enhancing the stability of particle formation and preventing gellification of the suspension. Suitable for the phase enhancer 126 include, for example, slightly polar alcohols. Exemplary slightly polar alcohols for use as the second phase enhancer include low carbon alcohols. The phase enhancer 126 may include, for example, primary alcohols of one to ten carbons such as methanol, ethanol, propanol, butanol, pentanol, hexanol, and the like. The phase enhancer may also be chosen from alkyl derivatives of alcohols of one to ten carbon atoms including, but not limited to, isopropanol, isobutanol, isopentanol, and the like. Secondary alcohols may also be suitable for use as a phase enhancer.

In one embodiment, the phase enhancer 126 is added to the system after the first phase is added by adding the contents of the hydrolysate reactor 110 to the particle reactor 120. The phase enhancer 126 is added to the particle reactor and allowed to equilibrate. The addition of the phase enhancer 126 prior to adding the catalyst to the particle reactor, enhances the stability of large particle formation, allows for the generation of consistent particle growth and prevents the gellification of the suspension.

The method includes adding the contents of the hydrolysate reactor 110 to the particle reactor 120. The first and second phases are then mixed together in the particle reactor 120 to form a blend. Mixing influences the size of the initial micellar diameter as well as particle growth and final particle size. Turbulent mixing tends to generate smaller particles and nearly uniform particle size distribution. Slower mixing with less turbulence tends to: (1) generate a wide particle size distribution; and (2) cause metal oxide particles to settle prematurely at the bottom of the particle reactor before attaining further particle growth to form unwanted packed solid particles. Therefore, a suitable mixing regime is desirable to effectively suspend large particles as the clusters grow from micelles to a final stable particle size and distribution. This suitable mixing regime further may be dictated by the type of agitator and the tip speed impeller velocity. The tip speed impeller velocity may be about 0.2 to 0.8 feet per second. In one embodiment, the first phase may be added to the second phase over a period of about 30 minutes to about 150 minutes.

After addition of the first phase to the second phase, a biphasic system forms as shown by the presence of a suspension or emulsion. The second surfactant aids in forming micelles to a size dictated by phase equilibrium. The particle reactor contains a biphasic system that allows particle growth from micelles. The temperature of the first phase may be from about 30° to about 80° C., and the temperature of the second phase may be from about 30° to about 100° C. The temperature of the initial emulsion can be about 30-80° C. to further enhance the biphasic system formed in the particle reactor. In one embodiment, the temperature is about 50-60° C., which is the cloud point for the nonionic surfactant PEG.

Figure 3:
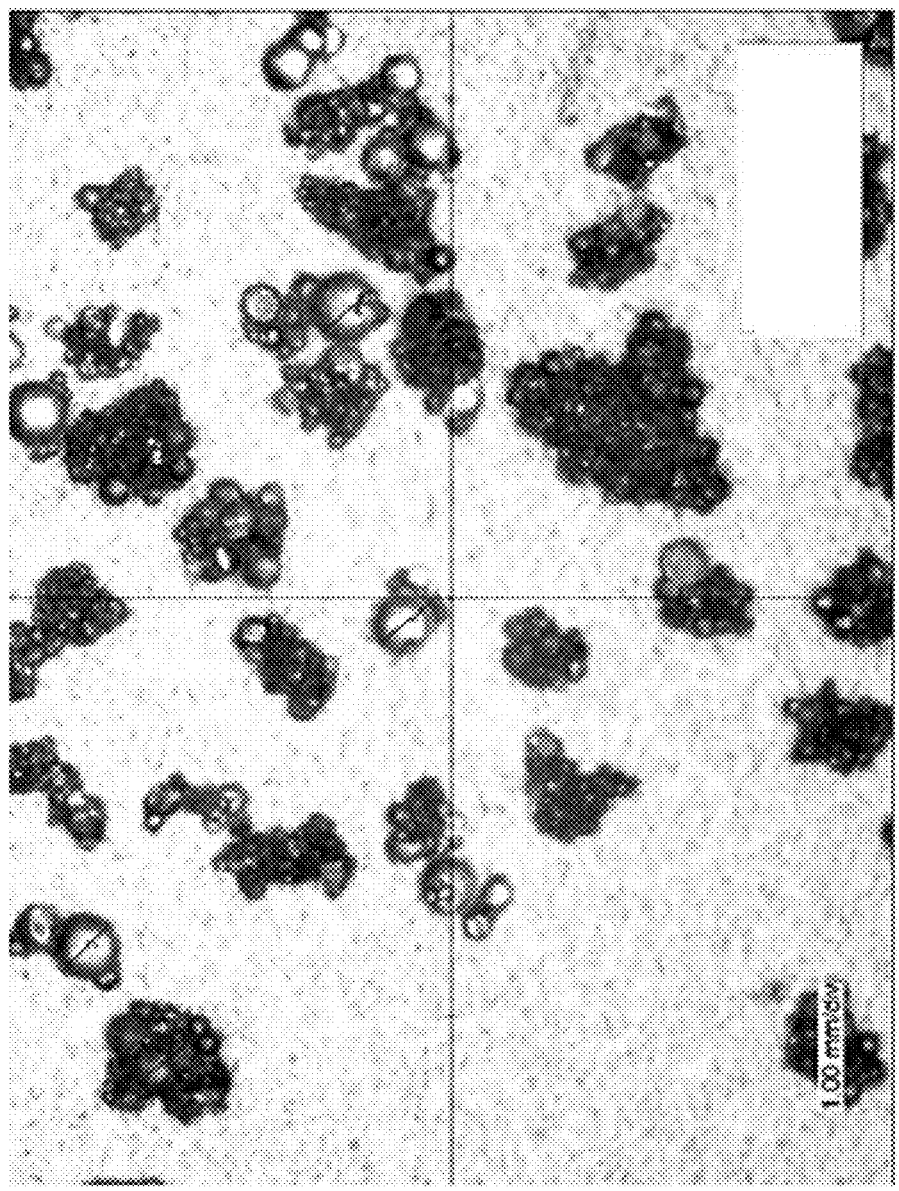
FIG. 3 shows an optical microscope of high purity silica particles formed in one embodiment of the method.
Figure 4:
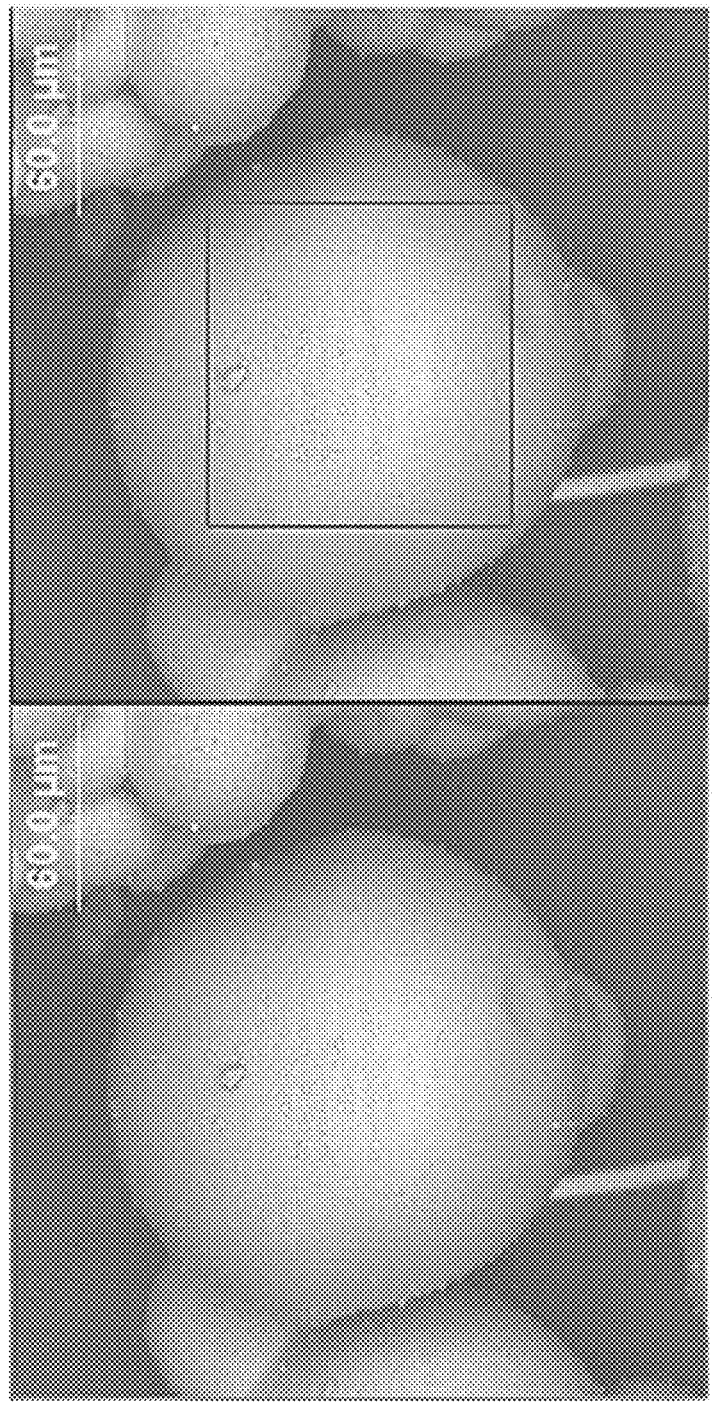
FIG. 4 shows a scanning electron microscopy of high purity silica particles derived from the method.

As described above, the phase enhancer 126 may be added to the system after the first phase from the hydrolysate reactor is added to the particle reactor. After addition of the phase enhancer 126, the method includes a measured or programmed addition of a second catalyst 128 to the particle reactor 120. The second catalyst 128 is added in a measured or programmed manner to the particle reactor 120 so that the metal oxide oligomer within the mixture forms the desired metal oxide particle as opposed to forming an undesirable gellified suspension or particle to particle adhesion by hydrogen bonding. Thus, a measured addition of the second catalyst 128 aids in partially opening up the layer of a nonionic surfactant to allow the particles to interact and form metal oxide bonds with other particles as a mode of particle growth as shown in FIG. 3 and FIG. 4.

Considering the specific example of forming silica particles, the formation of siloxane bonds between the silica particles allows the formation of larger particles while oligomers are undergoing internal self-condensation or curing. Otherwise, the addition of too much catalyst at one time may cause the surfactant to fragment and expose the micellar particles containing partially converted polymethoxysiloxane or higher oligomers therefrom which results in formation of a highly cross-linked gel containing water and organics and soluble silicates. This results in a permanent gellification of the suspension with no recovery of micellar particles. Therefore, the measured or programmed addition of the catalyst allows the controlled description of the surfactant from the surface of the particle.

The second catalyst 128 may be chosen from an acid or base. In an exemplary embodiment, the second catalyst 128 is a base. Suitable base catalyst materials include, for example, non-alkaline metal bases such, organic bases, non-metal bases that promote nucleophilic substitution or combinations of two or more thereof. Examples of suitable non-alkaline metal bases include about as ammonium hydroxide, as well as aqueous solution of ammonium carbonate or ammonium bicarbonate. Examples of suitable organic bases include quartenary alkyl ammonium hydroxides such as tetramethylammonium hydroxide. Examples of suitable non-metal bases that promote nucleophilic substitution include hydroxylamines and organic hydroxylamines such as N,N-dimethylhydroxylamine, N,N-diethylhydoxylamine; and 4-dimethylaminopyridine.

An acid catalyst can also be used, but the reactivity is slower towards particle growth. Examples of suitable acid catalysts includes inorganic acids such as hydrochloric acid, nitric acid and sulfuric acid, and the like.

In one embodiment, the base catalyst has a concentration of 0.01% to about 10% by weight. In another embodiment, the base catalyst can have a concentration of about 0.05% to about 5% by weight. In one embodiment in which the method is employed for forming silica particles, the base catalyst desirably has a relatively low concentration so that it will allow the silica particle within the micelle to form via self-condensation of polymethoxysiloxane or its oligomers to silica; otherwise undesirable cross-linking and gellification of the suspension will occur and concomitant formation of soluble silicates.

The base catalyst is added to the mixture until a mean silica particle size desired is obtained. Generally, the silica particle size increases with the amount of catalyst added to the particle reactor up to a critical pH. The silica particle size is measured as the particle diameter using a measuring system such as, for example, a Horiba LA950 system. During the initial addition of the catalyst, the pH of the suspension may be about 1.3. Depending on the amount of base catalyst added, the pH of the mixture may increase to a pH of about 5, depending upon the level of alkoxysilane and acid catalyst used in the hydrolysate. Desirably, the pH of the mixture is no greater than about 3.5 prior to treating with the second catalyst, and no greater than about 6 during the treatment step with the second catalyst. Once the silica particles grow to the desired size, the catalyst is no longer added and the silica particles are allowed to age at the temperature of the particle reactor.

Again, while the above conditions were described with respect to forming silica particles, it will be appreciated that such operating conditions and procedures may be suitable in the formation of other metal oxide particles.

After aging the suspended metal oxide particles, the organics are removed or stripped to obtain essentially an aqueous slurry or suspension 130 of metal oxide particles 140. The organics are mainly alcohols and nonpolar hydrocarbon that can be recycled. Removing the organics can be accomplished in a variety of ways such as high temperature evaporation past the highest boiling compound or by use of low temperature and negative pressure stripping as are known in the art.

The metal oxide particle obtained is a high purity metal oxide particle suspended in water. The concentration of water in this solution may be from about 50% to about 99% by weight. The concentration of metal oxide particles in this aqueous slurry may be about 1% to 50% by weight. In one embodiment, the concentration of metal oxide particles is about 25%. Further, the metal oxide particle obtained is highly pure and is generally free of impurities such as metals, alkalis, and boron. In one embodiment, the metal oxide particle(s) have total impurities of less than 100 ppb, and in another embodiment, the total impurities may be less than 50 ppb. In still another embodiment, the total metal impurities may be less than about 10 ppb. In yet another embodiment, the total impurities may be less than 1 ppb. In a specific embodiment, the method provides silica particles having less than 1 ppb of Fe. The majority of contamination is expected to come from the raw materials such as the alkoxysilanes and facilitating chemical agents such as acids/bases or organics—which typically are prepared without the use of metals or metal assisted reactions. Moreover, the latter can be purified by simple distillation and, when recovered, recycled back to the process, these organics are essentially metal-free when run in a glass separation column.

The foregoing method allows for and is capable of providing yields up to about 100% of the metal source or oligomers derived from it to metal oxide and a high yield on particles at the desired particle size and range. In one embodiment, the metal oxide particles formed by the present method may have a primary particle size of from about 0.5 microns to about 100 microns. In one embodiment, at least about 80% of the primary particles are within +/−15% of the mean diameter of the primary particle size. It will also be appreciated that primary particles may agglomerate. In one embodiment, the primary particles may agglomerate to sizes of from about 5 microns to about 1000 microns with a mean particle size that range from 150 microns to 350 microns. In one embodiment, the metal oxide particles obtained using the disclosed method may range from about 50 microns to about 600 microns. In contrast, the yield in known grinding and pulverization techniques is no more than 70% of theoretical metal oxide yield, whereas in the present method the particle yield may be better than 95% in the 60 to 600 micron range. In one embodiment, at least 80% of the metal oxide particles have a size of about 70 to about 350 microns. The metal oxide particle size may be measured as the particle diameter using a suitable measuring system such as, for example, a Horiba LA950 system. The surface area of silica particles prior to calcination and densification obtained via the method may be for example, from about 150 to about 800 $m^2/g$, the average pore radius may be about 15-45 Angstroms.

The metal oxide particles formed having a desired size can then be further treated to form fused, synthetic metal oxide. Any number of known steps can be performed on the metal oxide particles to form the synthetic metal oxide, such as washing, dewatering by fast settling, heating to dryness, calcining, and densifying (or sintering) the silica particles to form the fused synthetic silica materials.

EXAMPLES

The following examples for the production of synthetic metal oxides is intended only to illustrate methods and embodiments in accordance with the invention, and as such should not be construed as imposing limitations upon the claims. Unless specified otherwise, all ingredients or substrates identified are commercially available from common chemical suppliers.

Example 1

The following illustrates the production of a particle reactor was formed as follows: 350.7 grams high purity water is added to 5.25 grams of electronic grade 1500 MW polyethylene glycol. To this, 39.4 grams of butanol is added to form the particle reactor as shown by the presence of an emulsion. This mixture was kept at 52° C. under reflux.

A hydrolysate reactor was prepared as follows: 40.89 grams of butanol is added to 21 grams of water and 0.8 grams of 37% HCl. High purity tetramethylorthosilicate (TMOS) is added slowly so that the temperature rise achieves about 72° C. The total amount of TMOS added is such that a 25% silica results on an organics-free basis. After all TMOS is added, a co-surfactant formed separately with 23.6 grams of cyclohexane and 76.02 grams of high purity tertiary amyl alcohol is added and mixed thoroughly.

Figure 5:
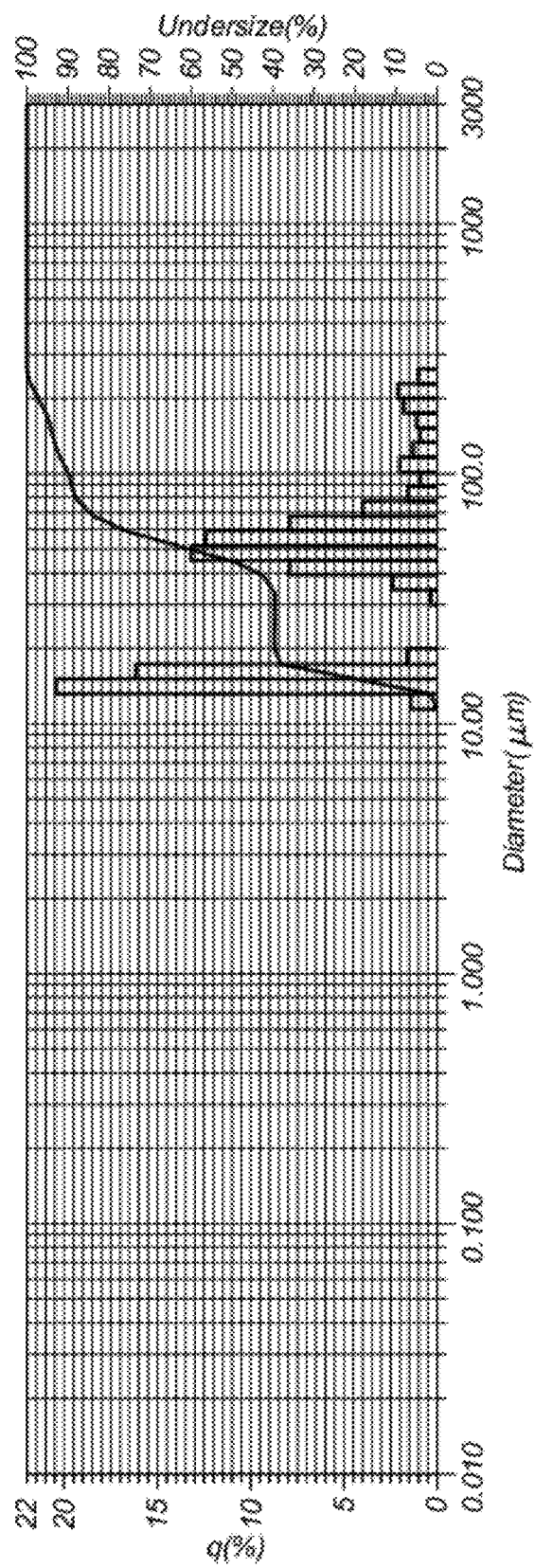
FIG. 5 shows a graph identifying the particle size distribution of high purity synthetic silica formed early during the addition of a second catalyst in accordance with one embodiment of the method.

The hydrolysate is added to the particle reactor at a rate of 52 to 54 ml in 5 minutes. The temperature is approximately isothermal at 52° C. under continuous reflux. After all the hydrolysate is added, about 150 grams of butanol is added and aged for 20 minutes. After ageing, controlled rate of aqueous ammonium hydroxide, e.g. 7% ammonium hydroxide, is added to promote condensation and particle growth. A typical rate is 3 gm/min. At this stage in the reaction, the pH is still acidic at about 3.0. An example of the particle size distribution in the early stages of ammonium hydroxide addition is shown in FIG. 5.

Figure 6:
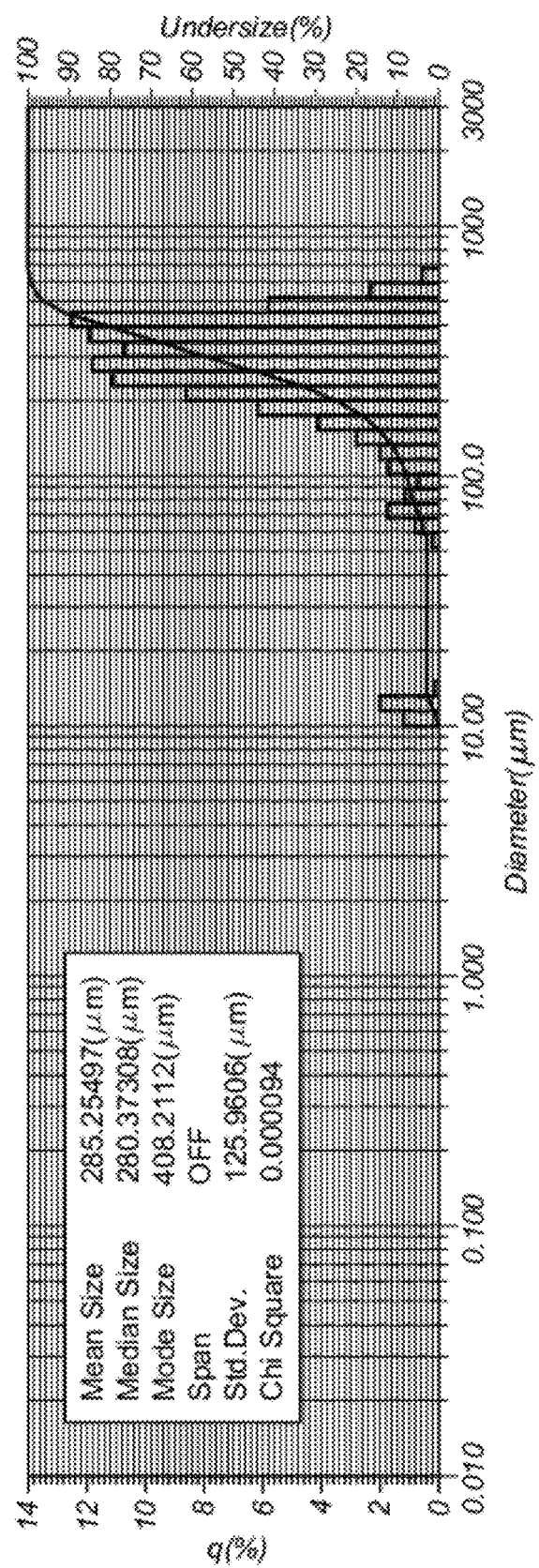
FIG. 6 shows a graph identifying the particle size distribution of high purity synthetic silica formed following the complete addition of the second catalyst in accordance with one embodiment of the method.

The ammonium hydroxide continued to be added slowly until the mean particle size is obtained as shown in FIG. 6. The final pH was about 4.0 and the condensation reaction/particle growth occurred in about 1.5 hours. The silica particles were allowed to age to a point where the particle size distribution was stabilized.

The resulting mixture was vacuum stripped to remove the organic phase, which is mostly butanol, along with the co-surfactant. The remaining water and silica was further treated to subsequent water washing to remove residual organics, mainly polyethylene glycol. In this remaining mixture, the silica yield was about 25 wt. % whereas the water was the remaining 75 wt. %. There was no need to classify the dried silica particles to obtain the desired particle size distribution. Moreover, the silica particle recovery was nearly 100% based on the amount of TMOS, unlike sol-gel techniques obtained by pulverization where there is significant amount of silica particles lost to due to classification via sieving of fines and larges.

Example 2

The following example illustrates the synthesis of titanium silicate, which may be useful, for example, as photocatalysts and in optics applications such as ultra low expansion glass for extreme UV lithography, space satellites, grated refractive index, and also for machine tool reference blocks. A particle reactor was formed as follows: 577.45 grams high purity water is added to 5.625 grams of electronic grade 1500 MW polyethylene glycol. To this, 42.1875 grams of butanol is added to form the particle reactor as shown by the presence of an emulsion. This mixture was kept at 52° C. under reflux.

A hydrosylate reactor was prepared as follows: 54.76 grams of butanol is added to 28.125 grams of water and 0.9813 grams of 37% HCl. The metal alkoxides in this example are TMOS and tetraisopropyl orthotitanate. The tetraisopropyl orthotitanate is provided as a solution comprising 20.9431 grams of tetraisopropyl orthotitanate and 271.0744 grams of butanol. The tetraisopropyl orthotitanate solution and 240 grams of TMOS are added simultaneously to the butanol/water/HCl mixture at a rate such that the addition to the hydrosylate precursor is completed in 69 minutes. After the metal alkoxides are added, a co-surfactant formed separately with 73.9113 grams of tertiary amyl alcohol and 44.775 grams of cyclohexane is added and mixed thoroughly.

Figure 7:
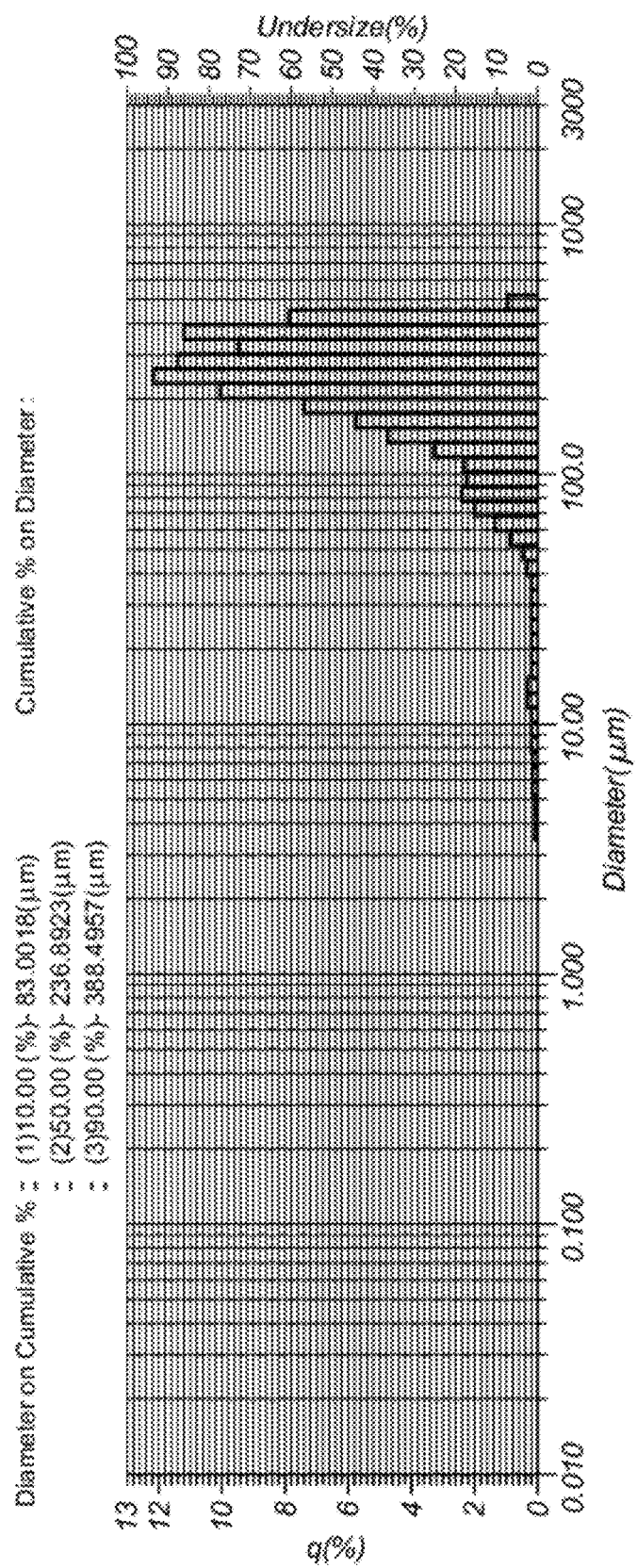
FIG. 7 shows a graph identifying the particle size distribution of high purity titanium silicate formed in one embodiment of the method.

The hydrosylate reactor is added to the particle reactor at a rate of 13.93 grams per minute; the particle reactor agitator is set at 205 RPM. After all the hydrolysate is added, about 169 grams of butanol is added. The temperature is approximately isothermal at 52° C. under continuous reflux. After equilibration, a 0.5% solution of aqueous ammonium hydroxide is added at a controlled rate to promote condensation and particle growth and the mixture is agitated (the speed of the particle reactor agitator being increased to 240 RPM) to obtain titanium silicate particles. FIG. 7 illustrates the particle size distribution of the titanium silicate obtained in Example 2. As shown in FIG. 7, the particles have a near unimodal particle size of 237 microns.

Example 3

The following example illustrates the synthesis of methylated silica having a relatively narrow particle size distribution, which may be useful for applications in cosmetics and as light diffusers for flat panel screens.

A particle reactor was prepared as follows: 1016.028 grams of water is added to 25.857 grams of 300 MW polyethylene glycol. To this, 38.025 grams of butanol is added to form the particle reactor as shown by the presence of an emulsion. This mixture was kept at 56° C. under reflux.

A hydrolysate reactor was prepared as follows: 45.63 grams of butanol is added to 17.49 grams of water and 0.5628 grams of 37% HCl. The silicon alkoxide in this example is a mixture prepared from 1.35 moles of methyltrimethoxysilane and 0.14 moles of tetramethylsiloxane. The silicon alkoxide composition is added to the hydrolysate reactor such that the solid loadings of the final methylated silica is about 7.33% of the final batch (in the particle reactor). The silicon alkoxide mixture is added to the hydrolysate reactor in 34 minutes and the hydrolysis is kept at adiabatic conditions under vigorous mixing. The hydrolysate was allowed to cool to room temperature and then 114.08 grams of tertiary amyl alcohol and 38.03 grams of cyclohexane were added, mixed thoroughly, and aged for several minutes.

Once aged, the hydrolysate was fed to the particle reactor at a rate of 22.73 grams per minute with constant agitation using a 4-blade, 45° pitch agitator at 360 RPM. At the end of the hydrolysate feed, 150 grams of butanol was added to the particle reactor, which was kept at 56° C. under reflux. Once the temperature was equilibrated, a 0.37% solution of ammonium hydroxide was slowly added to the particle reactor until the desired particle size is obtained.

Figure 8:
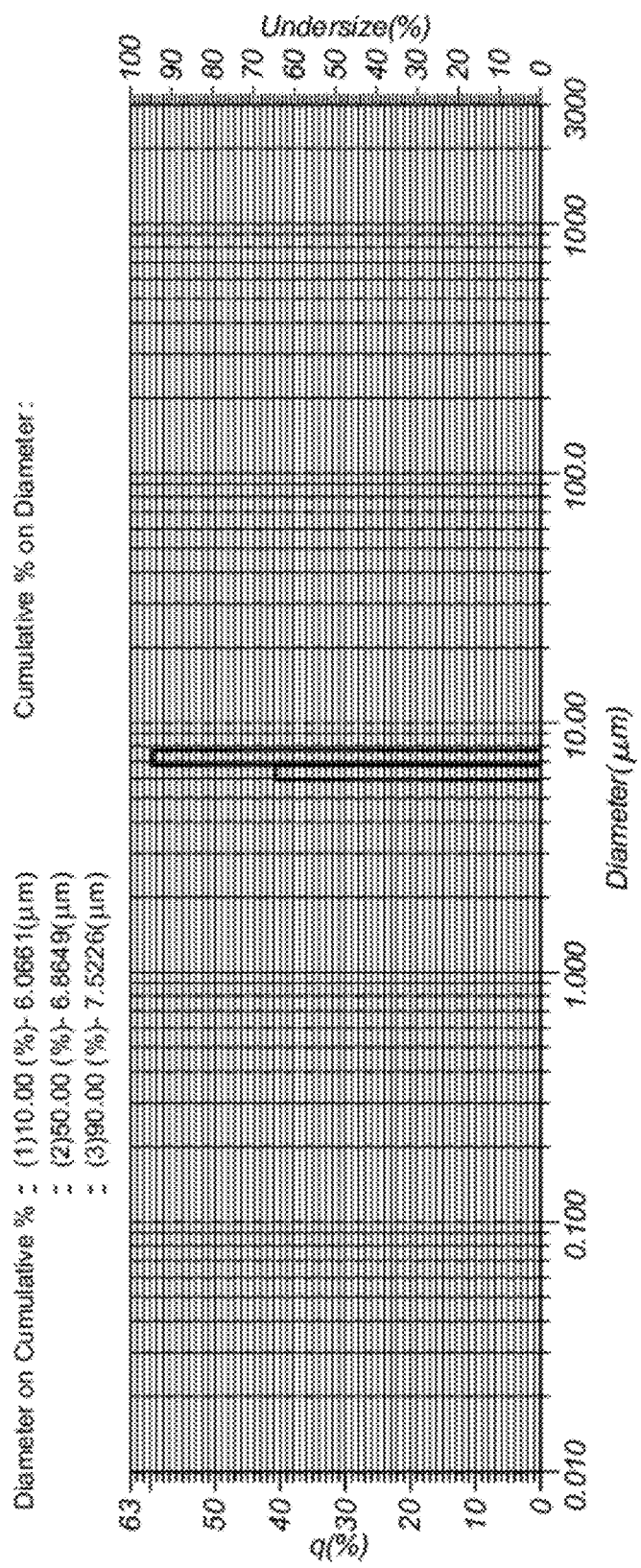
FIG. 8 shows a graph identifying the particle size distribution of high purity methylated silica early during the addition of a second catalyst in one embodiment of the method.
Figure 9:
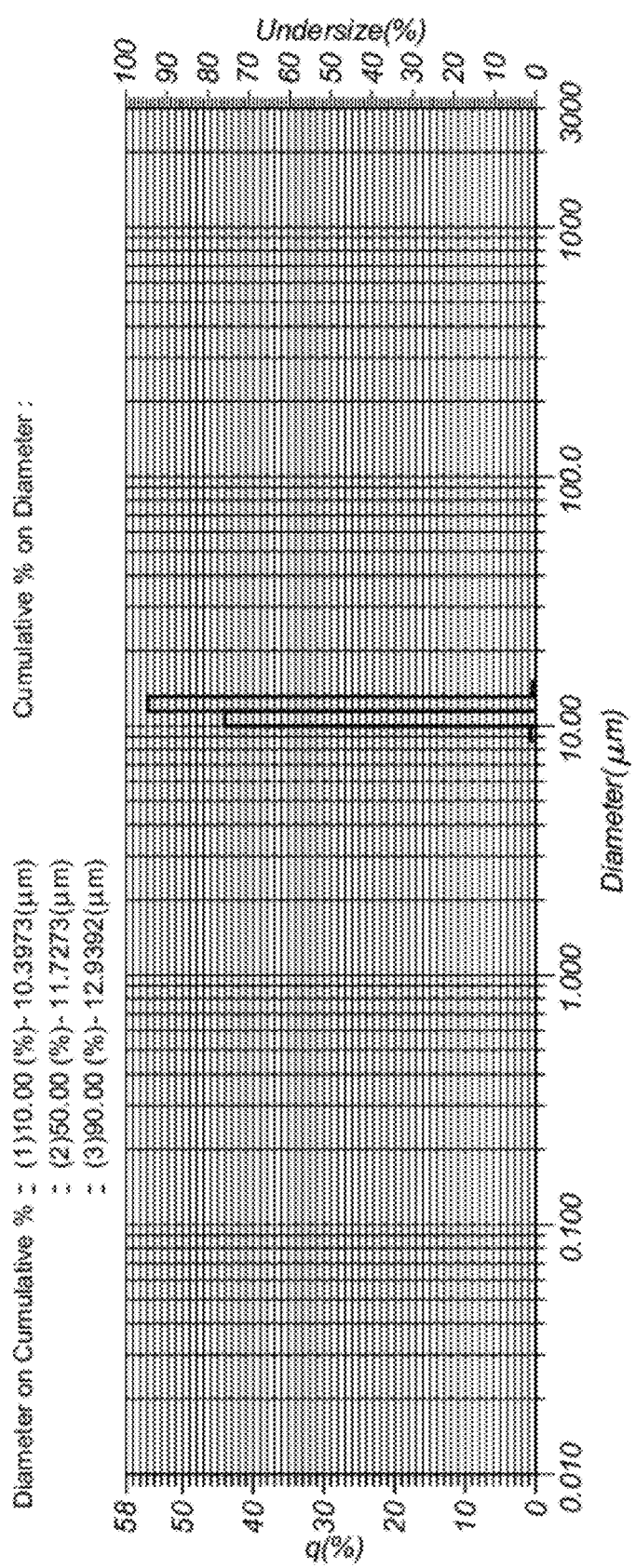
FIG. 9 shows a graph identifying the particle size distribution of high purity methylated silica following the complete addition of the second catalyst in accordance with one embodiment of the method.

FIG. 8 shows the particle size distribution after 33 minutes of adding the butanol. As shown in FIG. 8, the particles had a mean particle size of 6.8 microns. FIG. 9 shows the particle size distribution after the reaction was completed (after about 118 minutes). As shown in FIG. 9, the particles had an average particle size of 11.73 microns. The final particles had a near uniform particle size and a narrow particle size distribution (with a standard deviation of only 0.81 microns).

Embodiments of the invention have been described above and, obviously, modifications and alterations will occur to others upon the reading and understanding of this specification, including altering the identity of the metal alkoxide source to produce other metal oxide particles. The claims as follows are intended to include all modifications and alterations insofar as they come within the scope of the claims or the equivalent thereof.

What is claimed is:

1. A method for making metal-containing particles comprising:
    (a) forming a first phase comprising a mixture of water, a metal source, a first catalyst, a first surfactant, and a first alcohol;
    (b) adding the first phase to a second phase comprising water, a second alcohol, and a second surfactant to form a blend;
    (c) treating the blend with a phase enhancer, the phase enhancer being separately added to the blend via a composition other than that of the first phase or the second phase; and
    (d) treating the blend from (c) with a second catalyst to form metal-containing particles.

2. The method of claim 1, wherein the metal source comprises a metal alkoxide, a hydrolyzable organometallic compound, oxo metal oligomers, or mixtures of two or more thereof.

3. The method of claim 1, wherein the metal source comprises a metal chosen from Si, Ti, Fe, Al, Zr, Nb, Y, a rare earth metal, or a combination of two or more thereof.

4. The method of claim 1, wherein the metal source comprises a metal alkoxide, and the molar ratio of water to metal alkoxide source in the first phase is from about 0.5 to about 4.0.

5. The method in claim 1, wherein the first and/or second alcohol comprises a linear alcohol having 1-10 carbon atoms.

6. The method of claim 1, wherein the first surfactant is a co-surfactant system comprising a non-polar compound and an alcohol.

7. The method of claim 6, wherein the alcohol of the co-surfactant system is a tertiary alcohol.

8. The method of claim 1, wherein the second surfactant comprises a nonionic surfactant.

9. The method of claim 8, wherein the nonionic surfactant is chosen from a polyethoxylate, a polypropoxylate, a phenolate, a polyol having a molecular weight of 300-100,000, or a combination of two or more thereof.

10. The method of claim 1, comprising adding the first phase to the second phase at a rate such that the addition is completed over a period of about 30 minutes to about 150 minutes.

11. The method of claim 1, wherein forming the first phase comprises adding the metal source to a mixture comprising water, the first surfactant, and the first alcohol.

12. The method of claim 11, comprising adding the metal source to the first phase at a rate such that the addition is completed over a period of about 20 to about 120 minutes.

13. The method in claim 1, wherein forming the first phase comprises (a) adding the metal source to a mixture of water, the first catalyst, and the first alcohol, and (b) adding the first surfactant after the addition of the metal source.

14. The method of claim 1, wherein the phase enhancer comprises a primary or secondary alcohol.

15. The method of claim 1, wherein the pH of the blend prior to reacting the blend with the second catalyst is no greater than about 3.5, and the pH of the mixture during the treating operation (d) is no greater than about 6.

16. The method of claim 1, wherein the first catalyst comprises an acid catalyst or a base catalyst.

17. The method of claim 16 wherein the first catalyst comprises a base catalyst chosen from ammonium hydroxide, quaternary ammonium hydroxides, hydroxylamines, derivatives of hydroxylamines, amino pyridines, or a combination of two or more thereof.

18. The method of claim 17, wherein the base catalyst is a composition comprising about 0.01% to about 10% by weight of a catalyst material.

19. The method of claim 1, wherein the metal-containing particles are formed in an aqueous solution for which the amount of water is from about 50% to about 99% by weight.

20. The method of claim 15 wherein primary particles agglomerate to sizes from about 5 microns to about 1000 microns.

21. The method of claim 1, wherein the metal-containing particles have a primary particle size of about 0.5 microns to about 100 microns.

22. The method of claim 1, wherein the metal containing-particles comprise primary particles have a mean diameter, and greater than about 80% of the primary particles are within +/−15% of the mean diameter of the primary particles.

23. The method of claim 1, wherein the metal-containing particles are chosen from metal oxides, metal hydroxides, metal carbonates, or metal oxycarbonates.

24. The method of claim 1, wherein the metal-containing particles have a total cationic impurity concentration of less than 100 ppb.

25. The method of claim 1, wherein the metal-containing particles have a total cationic impurity concentration of less than 10 ppb.

26. The method of claim 1, wherein the phase enhancer comprises an alcohol chosen from an alcohol comprising from 1 to 10 carbon atoms.

27. The method of claim 1, wherein the phase enhancer comprises an alcohol chosen from butanol, pentanol, isopropanol, isobutanol, and isopentanol.

28. The method of claim 1, wherein the phase enhancer comprises butanol.

* * * * *